US010122038B2

(12) United States Patent
Yoshida et al.

(10) Patent No.: US 10,122,038 B2
(45) Date of Patent: Nov. 6, 2018

(54) HYDROGEN GENERATOR AND FUEL CELL SYSTEM

(71) Applicant: Panasonic Intellectual Property Management Co., Ltd., Osaka (JP)

(72) Inventors: Jun Yoshida, Osaka (JP); Akinori Yukimasa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 169 days.

(21) Appl. No.: 15/371,851

(22) Filed: Dec. 7, 2016

(65) Prior Publication Data
US 2017/0170504 A1 Jun. 15, 2017

(30) Foreign Application Priority Data

Dec. 14, 2015 (JP) .................................. 2015-243450

(51) Int. Cl.
*H01M 8/04* (2016.01)
*H01M 8/0612* (2016.01)
(Continued)

(52) U.S. Cl.
CPC ..... *H01M 8/0631* (2013.01); *H01M 8/04029* (2013.01); *H01M 8/04067* (2013.01);
(Continued)

(58) Field of Classification Search
CPC ........... H01M 8/0631; H01M 8/04067; H01M 8/04029; H01M 8/0687; H01M 8/04164;
(Continued)

(56) References Cited

U.S. PATENT DOCUMENTS

| | | | | |
|---|---|---|---|---|
| 2003/0129465 A1* | 7/2003 | Nakamura | ........ | H01M 8/04029 429/410 |
| 2010/0297513 A1* | 11/2010 | Yasuda | ............. | H01M 8/04029 429/423 |

FOREIGN PATENT DOCUMENTS

| | | |
|---|---|---|
| JP | 2005-243251 A | 9/2005 |
| JP | 2007-134247 | 5/2007 |

(Continued)

OTHER PUBLICATIONS

The Extended European Search Report dated Apr. 21, 2017 for the related European Patent Application No. 16201668.7.

*Primary Examiner* — Stewart A Fraser
(74) *Attorney, Agent, or Firm* — McDermott Will & Emery LLP

(57) ABSTRACT

A hydrogen generator includes a reformer that generates a hydrogen-containing gas from a source gas and reforming water, a condensed water channel through which condensed water flows, a circulating water channel through which circulating water flows, an ion exchange resin filter provided to the circulating water channel and deionizing the circulating water, a reservoir tank including a first reservoir provided to the condensed water channel and a second reservoir provided to the circulating water channel, a first communicator through which the first and second reservoirs are in communication with each other, and a reforming water channel that extends from a junction of the circulating water channel and supplies the circulating water as reforming water to the reformer. The pressure in the inner space of the first reservoir is maintained to be the same as the pressure in the inner space of the second reservoir.

16 Claims, 10 Drawing Sheets

(51) Int. Cl.
*H01M 8/04029* (2016.01)
*H01M 8/04007* (2016.01)
*H01M 8/04119* (2016.01)
*H01M 8/04291* (2016.01)
*H01M 8/0662* (2016.01)
*C01B 3/38* (2006.01)

(52) U.S. Cl.
CPC ... *H01M 8/04164* (2013.01); *H01M 8/04291* (2013.01); *H01M 8/0618* (2013.01); *H01M 8/0687* (2013.01); *C01B 3/384* (2013.01)

(58) Field of Classification Search
CPC .. H01M 8/04291; H01M 8/0618; C01B 3/384
See application file for complete search history.

(56) References Cited

FOREIGN PATENT DOCUMENTS

| | | |
|---|---|---|
| JP | 2008-269807 | 11/2008 |
| JP | 2008-300059 A | 12/2008 |
| JP | 2011-210652 | 10/2011 |
| JP | 2012-199019 | 10/2012 |
| JP | 2012-199019 A | 10/2012 |

\* cited by examiner

HYDROGEN GENERATOR AND FUEL CELL SYSTEM

BACKGROUND

1. Technical Field

The present disclosure relates to a hydrogen generator and a fuel cell system.

2. Description of the Related Art

Some hydrogen generators and fuel cell systems have a water treatment system that serves to, for example, supply reforming water, supply cooling water, or collect condensed water. A polymer electrolyte fuel cell system, for example, has a system that serves to treat cooling water used to cool a fuel cell and a system that serves to treat condensed water generated by cooling of a steam-containing gas so that the condensed water is reused as reforming water in a reformer. In fuel cell systems, condensed water can be collected to be reused as reforming water, and thus steam necessary for steam reforming is generated without water being externally supplied; in other words, the fuel cell systems can be in self-sustaining operation of water.

Japanese Unexamined Patent Application Publication No. 2012-199019, for instance, proposes a fuel cell system which has a unit for treating collected condensed water and in which the water treated in this unit is reused as reforming water in a reformer.

Specifically, the unit for treating collected condensed water has a first water tank into which collected water having a high $CO_2$ concentration flows, a second water tank into which collected water having a low $CO_2$ concentration flows, a unit for sterilizing the collected water in the second water tank with an antibacterial agent containing silver ions, and a unit for deionizing the sterilized water with an ion exchange resin filter. The water treated in such a unit is supplied to the reformer.

SUMMARY

In the technique described in Japanese Unexamined Patent Application Publication No. 2012-199019, however, a reduction in the size of the water treatment system of the fuel cell system and simplification of the structure thereof are not well studied. In addition, a reduction in the necessary cost of the water treatment system of the fuel cell system is also not well studied.

In view of the above-mentioned circumstances, one non-limiting and exemplary embodiment provides a hydrogen generator and fuel cell system that each include a water treatment system having a reduced size and simplified structure as compared with known techniques and also provides a hydrogen generator and fuel cell system that each enable a reduction in the necessary cost of the water treatment system.

In one general aspect, the techniques disclosed here feature a hydrogen generator including a reformer which generates a hydrogen-containing gas from a source gas and reforming water, a condensed water channel through which condensed water flows, a circulating water channel through which circulating water flows, an ion exchange resin filter which is provided to the circulating water channel and deionizes the circulating water, a reservoir tank which includes a first reservoir provided to the condensed water channel and a second reservoir provided to the circulating water channel, a first communicator through which the first and second reservoirs are in communication with each other, and a reforming water channel which extends from a junction of the circulating water channel and supplies the circulating water as reforming water to the reformer. The first reservoir has a first inlet from which the condensed water flows into the first reservoir and a first outlet from which the condensed water overflows to the outside of the reservoir tank, the second reservoir has a second inlet from which the circulating water flows into the second reservoir and a second outlet of which the circulating water flows out of the second reservoir, the condensed water channel is connected only to the first reservoir out of the first and second reservoirs, the first communicator is provided below the first outlet, and the reservoir tank is configured such that the pressure in the inner space of the first reservoir is maintained to be the same as the pressure in the inner space of the second reservoir.

The hydrogen generator according to an aspect of the present disclosure can have a water treatment system having a reduced size and simplified structure as compared with known techniques. The hydrogen generator according to an aspect of the present disclosure enables a reduction in the necessary cost of the water treatment system.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
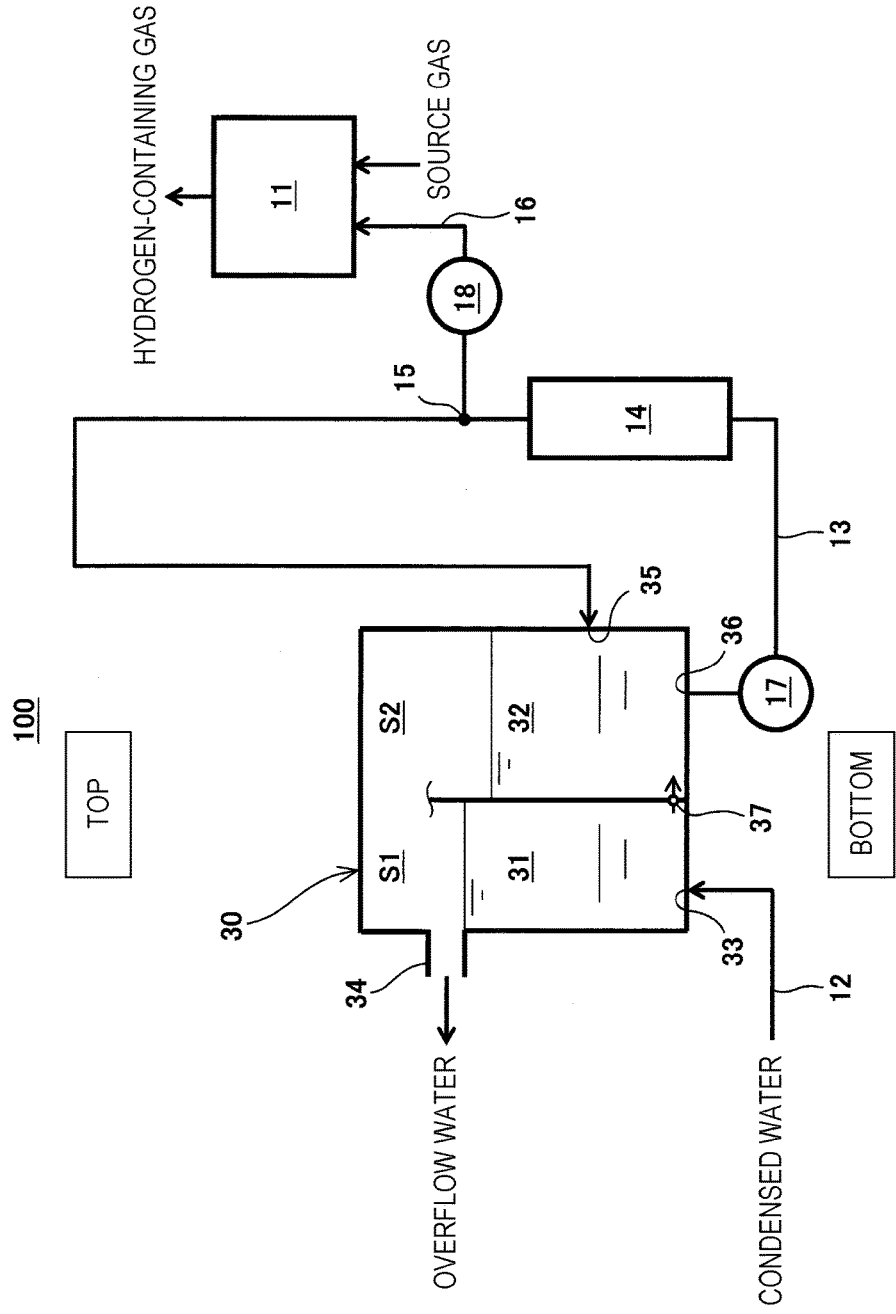
FIG. 1 illustrates an example of a hydrogen generator according to a first embodiment.

The inventors have intensively studied the problems of the water treatment system of the fuel cell system described in Japanese Unexamined Patent Application Publication No. 2012-199019 and made the following finding.

In this fuel cell system, the water treatment system has a first water tank and a second water tank, and the first water tank has a degassing mechanism. Accordingly, the water treatment system has the increased number of parts, which may cause the whole of the water treatment system to have a large size and a complicated structure. In addition, the necessary cost of the water treatment system may be increased.

Furthermore, in the fuel cell system, the effect of the pressure difference between the first water tank and the second water tank is not well considered. Hence, water in the first tank, which contains a component that is derived from a steam reforming reaction at high temperature and that may contaminate a catalyst in the cell stack of the fuel cell and a reforming catalyst, such as chlorine, calcium, sulfuric acid, or ammonium, and another water in the first tank, which contains bacteria, may be supplied to the second water tank in excess. The water containing a component that contaminates the catalysts promotes impairment of the fuel cell system, and the water containing bacteria causes a flow channel in the system to be clogged; thus, collected water needs to be well treated in a unit for treating collected water. This leads to increases in the amount of a sterilizing agent used in the unit for treating collected water and in the amount of an ion exchange resin, which may cause the size of the whole of the water treatment system to be increased. Moreover, the necessary cost of the water treatment system may increase.

The inventors have found that the known technique still has rooms for improvement in reducing the size and necessary cost of the water treatment system and in simplifying the structure thereof and accomplished the following aspect of the present disclosure.

That is, a hydrogen generator according to a first aspect of the present disclosure includes a reformer which generates a hydrogen-containing gas from a source gas and reforming water, a condensed water channel through which condensed water generated by cooling of a steam-containing gas flows, a circulating water channel through which circulating water flows, an ion exchange resin filter which is provided to the circulating water channel and deionizes the circulating water, a reservoir tank which includes a first reservoir provided to the condensed water channel and a second reservoir provided to the circulating water channel, a first communicator through which the first and second reservoirs are in communication with each other, and a reforming water channel which extends from a junction of the circulating water channel and supplies the circulating water as reforming water to the reformer, wherein the first reservoir has a first inlet from which the condensed water flows into the first reservoir and a first outlet from which the condensed water overflows to the outside of the reservoir tank, the second reservoir has a second inlet from which the circulating water flows into the second reservoir and a second outlet of which the circulating water flows out of the second reservoir, the condensed water channel is only connected to the first reservoir out of the first and second reservoirs, and the first communicator is provided below the first outlet, and the reservoir tank is configured such that the pressure in the inner space of the first reservoir is maintained to be the same as the pressure in the inner space of the second reservoir.

According to this configuration, the hydrogen generator of the first aspect enables the water treatment system to have a smaller size and simpler structure as compared with known techniques. In addition, the hydrogen generator according to the first aspect may cause the necessary cost of the water system to be reduced as compared with known techniques.

Specifically, the inside of the single reservoir tank is divided into the first reservoir and the second reservoir. The condensed water flows into the first reservoir, and the circulating water flows into the second reservoir. The first reservoir is open to atmospheric air via the first outlet from which the condensed water overflows to the outside, and the condensed water in the first reservoir can therefore be degassed without the degassing mechanism described in Japanese Unexamined Patent Application Publication No. 2012-199019.

Since the pressure in the internal space of the first reservoir is maintained to be the same as the pressure in the internal space of the second reservoir, the water levels in the first reservoir and second reservoir are free from the pressure difference generated between the condensed water channel and the circulating water channel. In other words, in the hydrogen generator according to the first aspect, only when the water in the second reservoir runs short, the condensed water in the first reservoir flows into the second reservoir through the first communicator in an amount equivalent to the amount of the water running short.

The condensed water generated by cooling of a steam-containing gas after steam reforming at high temperature (for example, approximately from 600 to 800° C.) may contain a component that contaminates a reforming catalyst, such as chlorine, calcium, sulfuric acid, or ammonium. The circulating water flowing through the circulating water channel is, on the contrary, free from a chemical reaction and therefore less likely to contain such a component that contaminates the catalyst.

Accordingly, a flow of the condensed water containing the component that contaminates the reforming catalyst, such as chlorine, calcium, sulfuric acid, or ammonium, into the purified circulating water more than necessary is reduced or prevented.

As a result, the amount of the ion exchange resin provided to the circulating water channel can be reduced in the hydrogen generator according to the first aspect as compared with known techniques.

In a hydrogen generator according to a second aspect of the present disclosure, the reservoir tank is configured such that the circulating water in the second reservoir in the hydrogen generator according to the first aspect flows through the circulating water channel without overflowing to the outside of the reservoir tank.

In the case where the amount of water in the reservoir tank is in excess in such a structure, only the condensed water is discharged. In other words, the circulating water that is purified by the ion exchange resin filter is not discharged in vain. Thus, the amount of the ion exchange resin can be reduced as compared with the case in which the circulating water is allowed to overflow to the outside and discharged.

In a hydrogen generator according to a third aspect of the present disclosure, each of the second inlet and second outlet of the second reservoir in the hydrogen generator according to the first or second aspect is connected not to the condensed water channel but to the circulating water channel.

According to such a structure, the condensed water channel through which the condensed water containing a component that contaminates the reforming catalyst, such as chlorine, calcium, sulfuric acid, or ammonium, flows is appropriately separated from the second reservoir that holds the circulating water (purified water) in the single reservoir tank.

A hydrogen generator according to a fourth aspect of the present disclosure, in the hydrogen generator according to any one of the first to third aspects, includes a first pump that is provided to the circulating water channel and that serves to circulate the circulating water and a second pump that is provided to the reforming water channel and that serves to adjust the flow rate of the reforming water.

Such a structure enables the circulating water (purified water) to flow through each of the circulating water channel and the reforming water channel in an adequate flow rate.

Specifically, an appropriate amount of the reforming water can be supplied to the reformer. The reforming reaction of the source gas can therefore be properly performed in the reformer.

A hydrogen generator according to a fifth aspect of the present disclosure has, in the hydrogen generator according to any one of the first to fourth aspects, the following structure: the junction is provided to part of the circulating water channel which is downstream of the ion exchange resin filter and upstream of the second reservoir in the flow direction of the circulating water. This structure is employed for the following reason.

When the hydrogen generator is in use, for instance, air exists in the gap between the particles of the ion exchange resin in some cases. In this case, when the circulating water passes through the ion exchange resin, the flow of the circulating water may cause air bubbles to be released through the ion exchange resin filter. Accordingly, in the hydrogen generator according to the fifth aspect, the junction causes the air bubbles released from the ion exchange resin filter to be guided to the circulating water channel without flowing into the reforming water channel. Thus, shortage of water in the reformer and the occurrence of breakdown of the reformer due to the air bubbles are reduced or prevented, which leads to an increase in the durability of the reformer.

Embodiments and examples of the present disclosure will now be described with reference to the accompanying drawings. The embodiments and examples that will now be explained are merely specific examples of present disclosure. The numbers, shapes, materials, components, and the positions and connection of the components are all merely examples, and the present disclosure is therefore not limited thereto. Among the components in the following explanation, components that are not mentioned in the independent claims that describes the broadest concept of the present disclosure will be described as optional components. In the drawings, descriptions for components denoted by the same symbols may be omitted. The drawings of the structures of apparatuses schematically illustrate components for easier understanding, and, for example, the shapes and sizes may be different in actuality in some cases.

First Embodiment

Structure of Apparatus

FIG. 1 illustrates an example of the hydrogen generator according to a first embodiment. In the drawings, the top and the bottom are defined for the sake of convenience, and the direction of gravity is from the top to the bottom.

In the example illustrated in FIG. 1, a hydrogen generator 100 of the first embodiment includes a reformer 11, a condensed water channel 12, a circulating water channel 13, an ion exchange resin filter 14, a junction 15, a reforming water channel 16, a first pump 17, a second pump 18, and a reservoir tank 30.

The reformer 11 generates a hydrogen-containing gas from a source gas and reforming water. Specifically, the source gas is subjected to a reforming reaction in the reformer 11 into the hydrogen-containing gas. Any reforming reaction may be performed provided that the reforming water is used in the reaction. Examples of the reforming reaction include a steam reforming reaction and an autothermal reaction. Catalytic metal used as a reforming catalyst can be generally at least one selected from the group consisting of noble metal catalysts, such as Pt, Ru, and Rh, and Ni. The hydrogen-containing gas discharged from the reformer 11 is utilized in an appropriate hydrogen-utilizing apparatus (not illustrated, but for example, fuel cell). Since the reformer 11 operates at high temperature (for instance, approximately from 600 to 800° C.), the outer shell of the reformer 11 may be formed of metal such as stainless steel.

Although not illustrated in FIG. 1, equipment necessary in the reforming reaction is properly provided. In the case where, for example, the reforming reaction is a steam reforming reaction, an evaporator that evaporates the reforming water to generate steam is provided. In the case where the reforming reaction is an autothermal reaction, the hydrogen generator 100 further includes an air supplier that supplies air to be used in the reforming reaction.

The source gas is supplied to the reformer 11 by a source gas supplier (not illustrated). The source gas supplier serves to adjust the flow rate of the source gas to be supplied to the reformer 11 and, for example, includes a booster and a flow regulating valve. Alternatively, the source gas supplier may include any one of the booster and the flow regulating valve. An example of the booster to be used is a booster pump, but the booster is not limited thereto. The source gas is supplied from a gas supply source. The gas supply source has a certain supply pressure; examples thereof include a source gas cylinder or a source gas infrastructure. Examples of a usable source gas include a utility gas and natural gas mainly containing methane and a hydrocarbon fuel gas containing organic compounds at least containing carbon and hydrogen, such as liquefied petroleum gas (LPG). The term "utility gas" refers to a gas supplied from gas companies to households through pipes.

The condensed water channel 12 is a flow channel through which condensed water generated by cooling of a steam-containing gas flows. The condensed water channel 12 has a condenser not illustrated in FIG. 1. The steam-containing gas may be, for example, the hydrogen-containing gas generated by the reformer 11; alternatively, in the case where the hydrogen generator 100 is incorporated into a fuel cell system, the steam-containing gas may be an exhaust gas discharged from the fuel cell.

The circulating water channel 13 is a flow channel through which the circulating water flows. The ion exchange resin filter 14 is provided to the circulating water channel 13 and deionizes the circulating water. The first pump 17 is also provided to the circulating water channel 13. The first pump 17 may have any structure provided that it enables the circulating water flowing through the circulating water channel 13 to be circulated. Examples of the first pump 17 include axial-flow pumps with impellers and plunger pumps. This mechanism allows the circulating water to be circulated through the circulating water channel 13, so that the circulating water is deionized (purified).

The reforming water channel 16 is a flow channel that extends from the junction 15 of the circulating water channel 13 and that serves to send the circulating water as the reforming water to the reformer 11. The second pump 18 is provided to the reforming water channel 16. The second pump 18 is an instrument for adjusting the flow rate of the reforming water that is to be supplied to the reformer 11. The second pump 18 may have any structure provided that it can adjust the flow rate of the reforming water. Examples of the second pump 18 include plunger pumps. This mechanism enables the circulating water (purified water) to flow in each of the circulating water channel 13 and the reforming water channel 16 in an adequate flow rate. Specifically, a proper amount of reforming water can be supplied to the reformer 11. Thus, the reforming reaction of the source gas can be appropriately performed in the reformer 11.

The reservoir tank 30 has a first reservoir 31 for the condensed water channel 12 and a second reservoir 32 for the circulating water channel 13. The outer shell of the reservoir tank 30 may be formed of highly corrosion-resistant metal, such as stainless steel, or a highly chemical-resistant plastic material, such as polypropylene. The first reservoir 31 has a first inlet 33 from which the condensed water flows in and a first outlet 34 from which the condensed water overflows to the outside. The first inlet 33 is connected not to the circulating water channel 13 but to the condensed water channel 12. The second reservoir 32 has a second inlet 35 from which the circulating water flows in and a second outlet 36 of which the circulating water flows out. Each of the second inlet 35 and the second outlet 36 is connected not to the condensed water channel 12 but to the circulating water channel 13. The circulating water in the second reservoir 32 flows through the circulating water channel 13 without overflowing to the outside.

In the hydrogen generator 100 of the first embodiment, for example, the reservoir tank 30 has a divider (for instance, partition 38 illustrated in FIGS. 5 and 6), which allows the first reservoir 31 and the second reservoir 32 to be formed in the single reservoir tank 30.

In the hydrogen generator 100 of the first embodiment, the first reservoir 31 and the second reservoir 32 are in communication with each other via a first communicator 37 formed below the first outlet 34, and the pressure in the inner space S1 of the first reservoir 31 is maintained to be the same as that in the inner space S2 of the second reservoir 32. Examples of a specific structure for maintaining the pressures in the inner spaces S1 and S2 to be the same will be described in first and second examples. Examples of the specific structure of the first communicator 37 will be described in third and fourth examples.

In the hydrogen generator 100 of the first embodiment, the junction 15 is provided to part of the circulating water channel 13 that is downstream of the ion exchange resin filter 14 and upstream of the second reservoir 32 in the flow direction of the circulating water. This is for the following reason.

Figure 2:
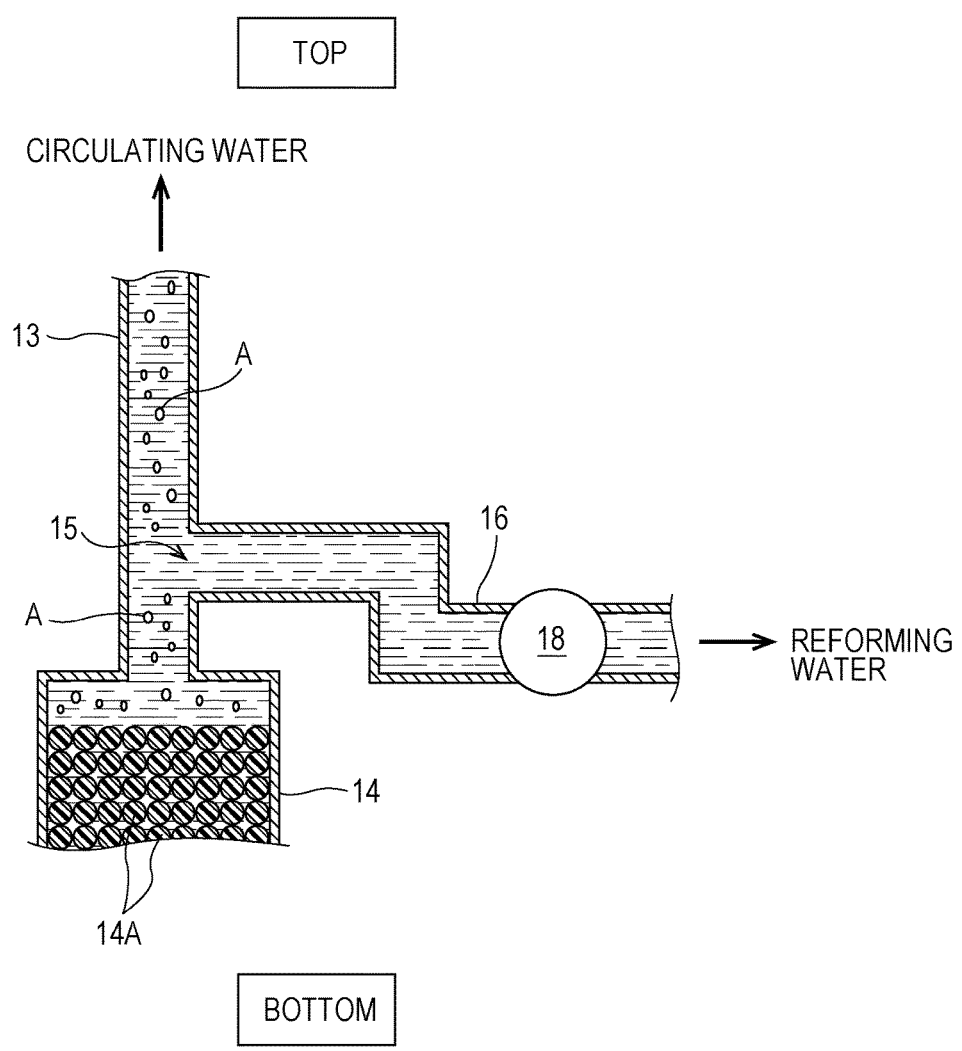
FIG. 2 illustrates the junction in FIG. 1.

When the hydrogen generator 100 is in use, for instance, air may exist in the gap between the particles of an ion exchange resin 14A as illustrated in FIG. 2. In this case, when the circulating water passes through the ion exchange resin 14A, the flow of the circulating water may cause air bubbles A to be released from the ion exchange resin filter 14. Accordingly, in the hydrogen generator 100 of the first embodiment, the junction 15 enables the air bubbles A released from the ion exchange resin filter 14 to be guided to the circulating water channel 13 without being guided to the reforming water channel 16. Thus, shortage of water in the reformer 11 and the occurrence of breakdown of the reformer 11 due to the air bubbles A are reduced or prevented, which leads to an increase in the durability of the reformer 11.

Operation

An example of the operation of the hydrogen generator 100 in an activated state will now be described with reference to FIG. 1.

The operation that will be described below may be automatically performed by a controller (not illustrated) including, for instance, an arithmetic processor (not illustrated) and a memory (not illustrated) storing a control program that is read by the arithmetic processor to initiate the operation.

Water (for instance, city water) is externally supplied from a water supply port 40 (for example, see FIGS. 5 and 6) provided to the lid of the second reservoir 32 of the reservoir tank 30. Whether a certain amount of water has been supplied to the reservoir tank 30 or not can be checked by the presence of water discharged from the first outlet 34. In the case where ion exchanged water is used instead of city water, the amount of the ion exchange resin 14A can be reduced.

The preparation for the operation of the hydrogen generator 100 has been completed in this manner.

The first pump 17 is subsequently activated. Then, the circulating water held in the second reservoir 32 flows out of the second outlet 36 into the circulating water channel 13. The circulating water is purified by the ion exchange resin filter 14 at this time.

The second pump 18 is subsequently activated. Then, an adequate amount of the reforming water is sent from the junction 15 of the circulating water channel 13 to the reformer 11 through the reforming water channel 16. In the reformer 11, a hydrogen-containing gas is generated through a reforming reaction using the source gas and the reforming water. The hydrogen-containing gas is utilized in an appropriate hydrogen-utilizing apparatus (for example, fuel cell).

The hydrogen-containing gas generated in the reformer 11 and a combustion exhaust gas generated by combusting the hydrogen-containing gas contain steam. Cooling such steam-containing gases with a condenser (not illustrated) generates condensed water from the steam-containing gases. The condensed water flows into the first reservoir 31 through the condensed water channel 12.

The excessive part of the condensed water in the first reservoir 31 is drained by overflowing from the first outlet 34 to the outside.

In the case where the circulating water runs short, the condensed water is transferred from the first reservoir 31 to the second reservoir 32 though the first communicator 37 in an amount equivalent to the amount of the water running short. The condensed water transferred in this case is then purified by the ion exchange resin filter 14 and reused as reforming water in the reformer 11.

The hydrogen generator 100 of the first embodiment enables the water treatment system to have a reduced size and simplified structure as compared with known techniques. Furthermore, the hydrogen generator 100 of the first embodiment also enables the cost of the water system to be reduced as compared with known techniques.

Specifically, the inside of the single reservoir tank 30 is divided into the first reservoir 31 and the second reservoir 32. The condensed water and the circulating water flow into the first reservoir 31 and the second reservoir 32, respectively. The first reservoir 31 is open to atmospheric air via the first outlet 34 from which the condensed water overflows to the outside, and the condensed water held in the first reservoir 31 can be therefore degassed without the degassing mechanism described in Japanese Unexamined Patent Application Publication No. 2012-199019.

Since the pressure in the internal space S1 of the first reservoir 31 is maintained to be the same as the pressure in the internal space S2 of the second reservoir 32, the water levels in the first reservoir 31 and second reservoir 32 are free from the pressure difference generated between the condensed water channel 12 and the circulating water channel 13. That is, in the hydrogen generator 100 of the first embodiment, only when the water in the second reservoir 32 runs short, the condensed water in the first reservoir 31 flows into the second reservoir 32 through the first communicator 37 in an amount equivalent to the amount of the water running short. Thus, the condensed water in the first reservoir 31 flows into the second reservoir 32 through the first communicator 37 in an amount equivalent to the amount of the water that is supplied to the reformer 11 through the reforming water channel 16 and that is used as the reforming water in the reformer 11.

The condensed water generated by cooling of a steam-containing gas after steam reforming at high temperature (for example, approximately from 600 to 800° C.) may contain a component that contaminates a reforming catalyst. The circulating water flowing through the circulating water channel 13 is free from a chemical reaction and therefore less likely to contain such a component that contaminates the catalyst.

Accordingly, the condensed water containing a component that contaminates the reforming catalyst, such as chlorine, calcium, sulfuric acid, or ammonium, is restrained or prevented from flowing into the purified circulating water in an amount exceeding the necessary amount for the use as the reforming water in the reformer 11.

The amount of the ion exchange resin 14A provided to the circulating water channel 13 is thus reduced in the hydrogen generator 100 of the first embodiment as compared with known techniques.

In the hydrogen generator 100 of the first embodiment, the circulating water in the second reservoir 32 flows through the circulating water channel 13 without overflowing to the outside. Hence, in the case where the amount of the water in the reservoir tank 30 is in excess, only the condensed water is discharged. In other words, the circulating water that is purified by the ion exchange resin filter 14 is not discharged in vain. Thus, the amount of the ion exchange resin 14A can be reduced as compared with the case in which the circulating water is allowed to overflow to the outside and discharged.

In the hydrogen generator 100 of the first embodiment, the condensed water channel 12 is connected only to the first reservoir 31 out of the first and second reservoirs 31 and 32. Each of the second inlet 35 and the second outlet 36 of the second reservoir 32 is connected not to the condensed water channel 12 but to the circulating water channel 13. The condensed water channel 12 through which the condensed water containing a component that contaminates the reforming catalyst, such as chlorine, calcium, sulfuric acid, or ammonium, flows can be appropriately separated from the second reservoir 32 that holds the circulating water (purified water) in the single reservoir tank 30. Thus, as compared with the case where the second reservoir 32 is in connection with the condensed water channel 12, the circulating water (purified water) held in the second reservoir 32 can be kept clean, which leads to a reduction in the amount of the ion exchange resin 14A.

First Example

Figure 3:
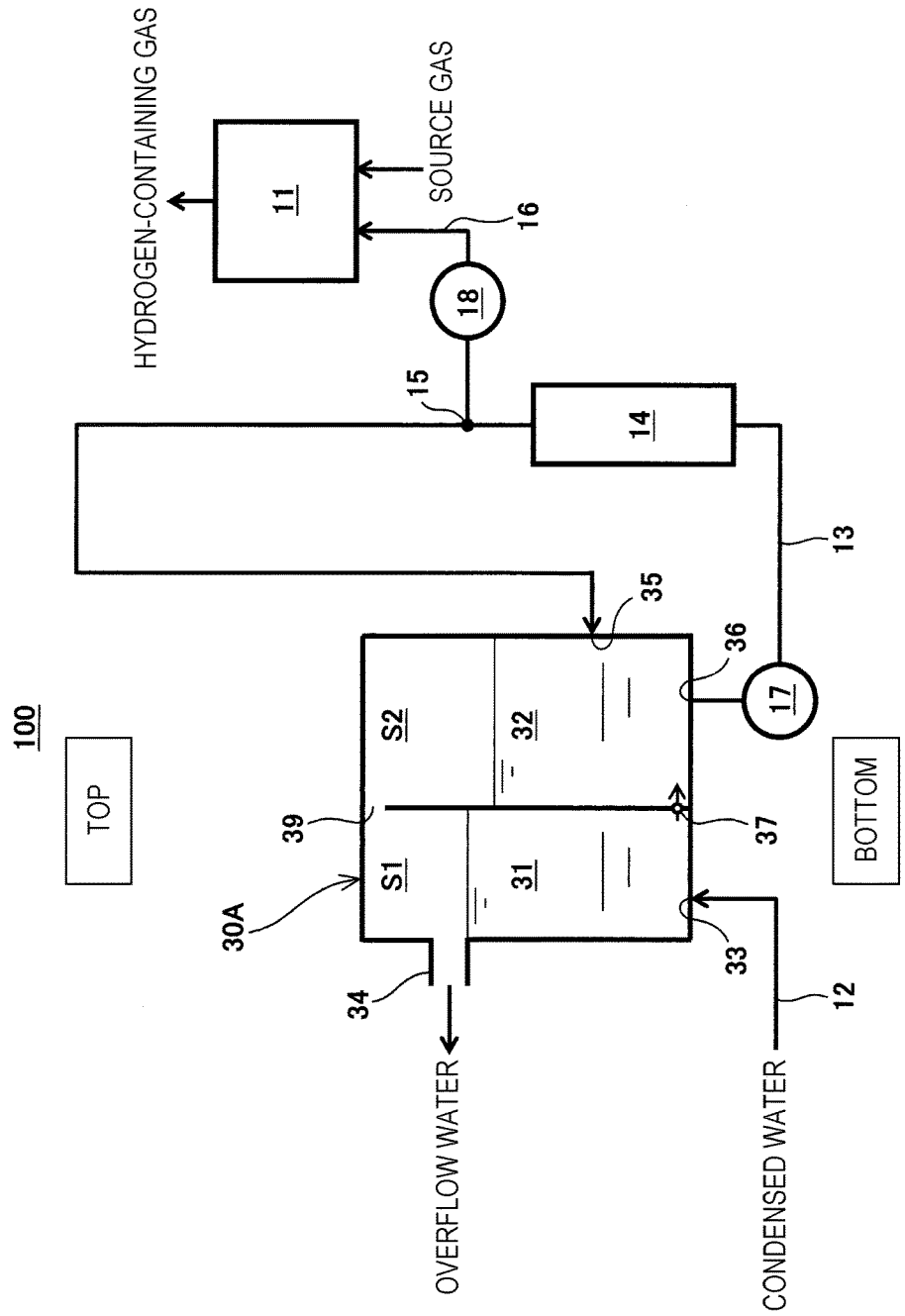
FIG. 3 illustrates an example of the hydrogen generator of a first example of the first embodiment.

FIG. 3 illustrates an example of the hydrogen generator of a first example of the first embodiment.

In the example illustrated in FIG. 3, the hydrogen generator 100 of the first example includes the reformer 11, the condensed water channel 12, the circulating water channel 13, the ion exchange resin filter 14, the junction 15, the reforming water channel 16, the first pump 17, the second pump 18, and a reservoir tank 30A.

Since the reformer 11, the condensed water channel 12, the circulating water channel 13, the ion exchange resin filter 14, the junction 15, the reforming water channel 16, the first pump 17, and the second pump 18 are the same as those in the first embodiment, the detailed description thereof is omitted.

The hydrogen generator 100 of the first example has the following structure: the first reservoir 31 and the second reservoir 32 in the hydrogen generator 100 according to any one of the first to fifth aspects are in communication with each other via a second communicator 39 disposed above the first outlet 34. The second communicator 39 may be a hole formed in a member for dividing the inside of the reservoir tank 30A into the first reservoir 31 and the second reservoir 32 (for example, the partition 38 in FIGS. 5 and 6).

In such a structure, the second communicator 39 enables the atmospheric pressure in the internal space S1 of the first reservoir 31 to be maintained to be the same as that in the internal space S2 of the second reservoir 32. Since the second communicator 39 is disposed above the first outlet 34, the condensed water does not flow from the first reservoir 31 to the second reservoir 32 through the second communicator 39.

Except for this change, the hydrogen generator 100 of the first example may have the same structure as the hydrogen generator 100 according to any one of the first to fifth aspects.

Second Example

Figure 4:
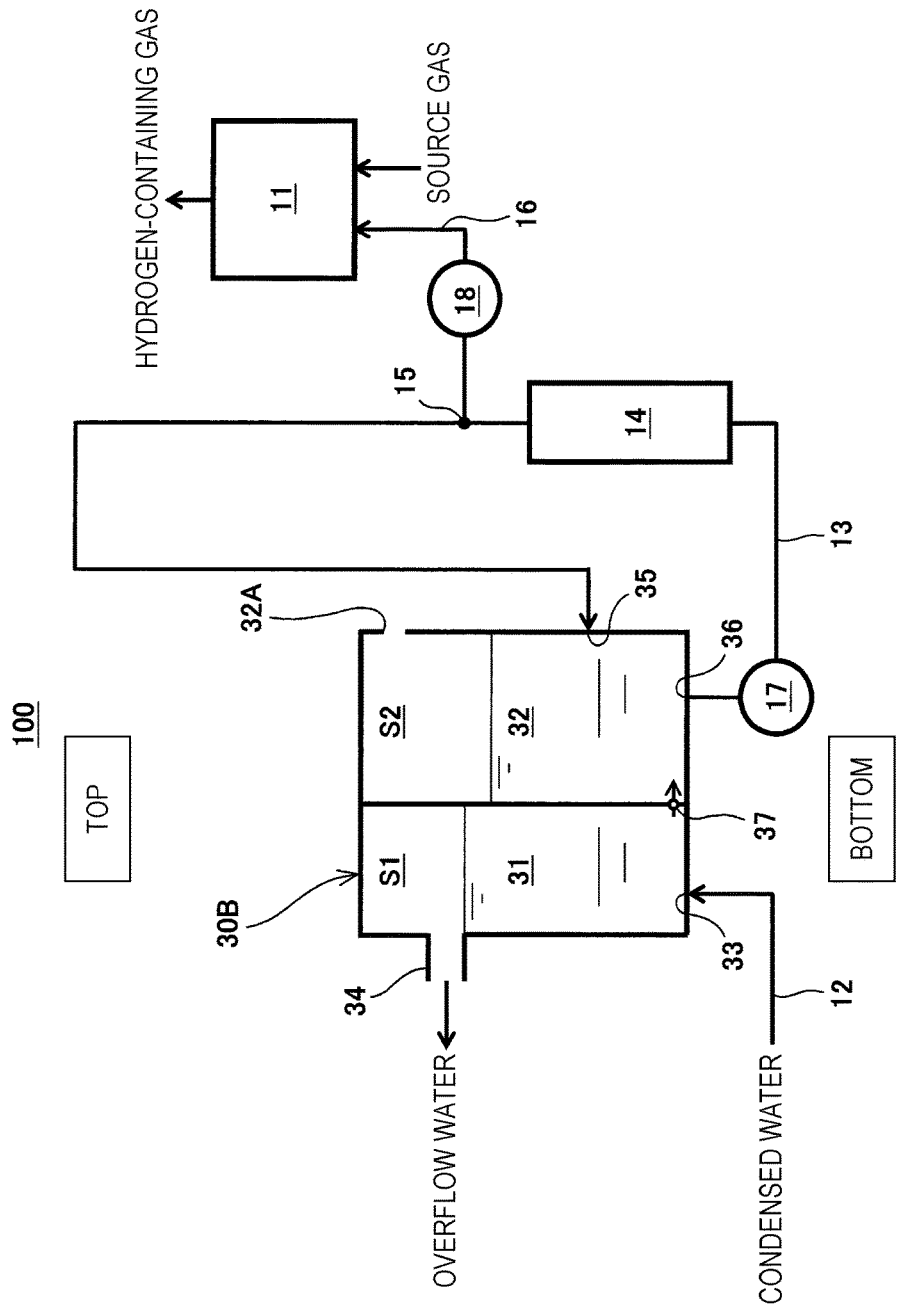
FIG. 4 illustrates an example of the hydrogen generator of a second example of the first embodiment.

FIG. 4 illustrates an example of the hydrogen generator of a second example of the first embodiment.

In the example illustrated in FIG. 4, the hydrogen generator 100 of the second example includes the reformer 11, the condensed water channel 12, the circulating water channel 13, the ion exchange resin filter 14, the junction 15, the reforming water channel 16, the first pump 17, the second pump 18, and a reservoir tank 30B.

Since the reformer 11, the condensed water channel 12, the circulating water channel 13, the ion exchange resin filter 14, the junction 15, the reforming water channel 16, the first pump 17, and the second pump 18 are the same as those in the first embodiment, the detailed description thereof is omitted.

The hydrogen generator 100 of the second example has the following structure: the internal space S1 of the first reservoir 31 and the internal space S2 of the second reservoir 32 in the hydrogen generator 100 according to any one of the first to fifth aspects are open to atmospheric air. The inner space S2 of the second reservoir 32 may be, for example, open to atmospheric air via an opening 32A formed in the external wall of the outer shell of the reservoir tank 30B at the part contacting the internal space S2. The position of the opening 32A may be slightly above the position of the first outlet 34 of the first reservoir 31. This is for the following reason: in the case where the water level in the second reservoir 32 is higher than the water level in the first reservoir 31, an increase in the gap therebetween is highly likely to cause an increase in the amount of a cooling water (ion exchanged water) that flows from the second reservoir 32 to the first reservoir 31 through the first communicator 37.

In such a structure, the first outlet that allows the internal space S1 of the first reservoir 31 to be open to atmospheric air and the opening 32A that allows the internal space S2 of the first reservoir 32 to be open to atmospheric air enables the atmospheric pressure in the internal space S1 of the first reservoir 31 to be maintained to be the same as that in the internal space S2 of the second reservoir 32. Furthermore, in the case where the water level in the first reservoir 31 is higher than the water level in the second reservoir 32, the opening 32A provided so as to be positioned above the first outlet 34 enables the adequate amount of the condensed water to flow from the first reservoir 31 to the second reservoir 32 through the first communicator 37. In addition, in the case where the water level in the second reservoir 32 is higher than the water level in the first reservoir 31, the opening 32A provided so as to be positioned slightly above the first outlet 34 enables a flow of cooling water (ion exchanged water) more than necessary from the second reservoir 32 to the first reservoir 31 through the first communicator 37 to be reduced or prevented.

Except for this change, the hydrogen generator 100 of the second example may have the same structure as the hydrogen generator 100 according to any one of the first to fifth aspects.

Third Example

Figure 5:
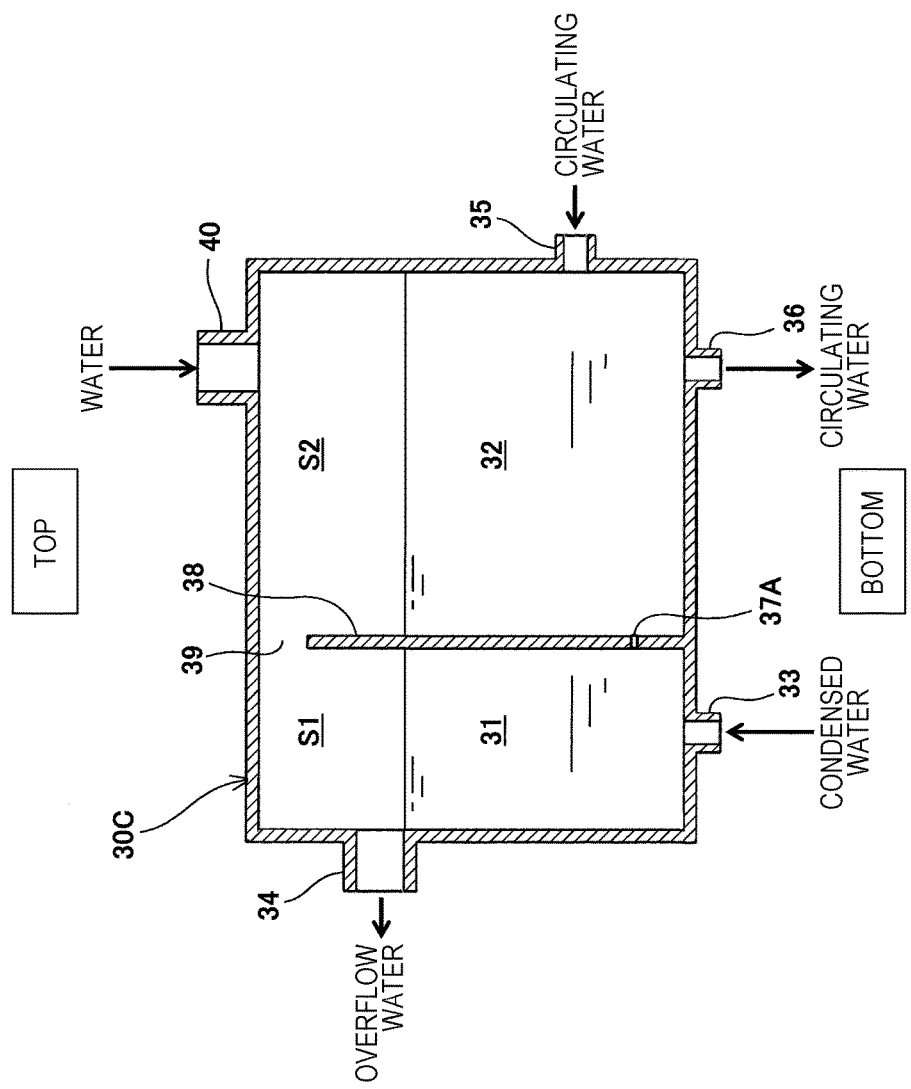
FIG. 5 illustrates an example of the reservoir tank of the hydrogen generator of a third example of the first embodiment.

FIG. 5 illustrates an example of the reservoir tank of the hydrogen generator of a third example of the first embodiment.

The hydrogen generator 100 of the third example has the following structure: in the hydrogen generator 100 according to any one of the first to fifth aspects or any one of the first and second examples of the first embodiment, a reservoir tank 30C has a partition 38 that serves to divide the inside of the reservoir tank 30C into the first reservoir 31 and the second reservoir 32, and the first communicator 37 is a hole 37A formed in the partition 38. FIG. 5 illustrates an example in which the hole 37A is formed in the partition 38 of the reservoir tank 30A of the first example; however, this hole may be formed in the partition 38 of the reservoir tank 30B of the second example.

In this structure, only when the water in the second reservoir 32 runs short, the condensed water in the first reservoir 31 flows into the second reservoir 32 through the hole 37A in an amount equivalent to the amount of the water running short without using additional parts and causing the structure to be complicated. In other words, only when the water level in the second reservoir 32 is lower than the water level in the first reservoir 31, the condensed water in the first reservoir 31 can be allowed to flow into the second reservoir 32 through the hole 37A.

Except for this change, the hydrogen generator 100 of the third example may have the same structure as the hydrogen generator 100 according to any one of the first to fifth aspects or any one of the first and second examples of the first embodiment.

Fourth Example

Figure 6:
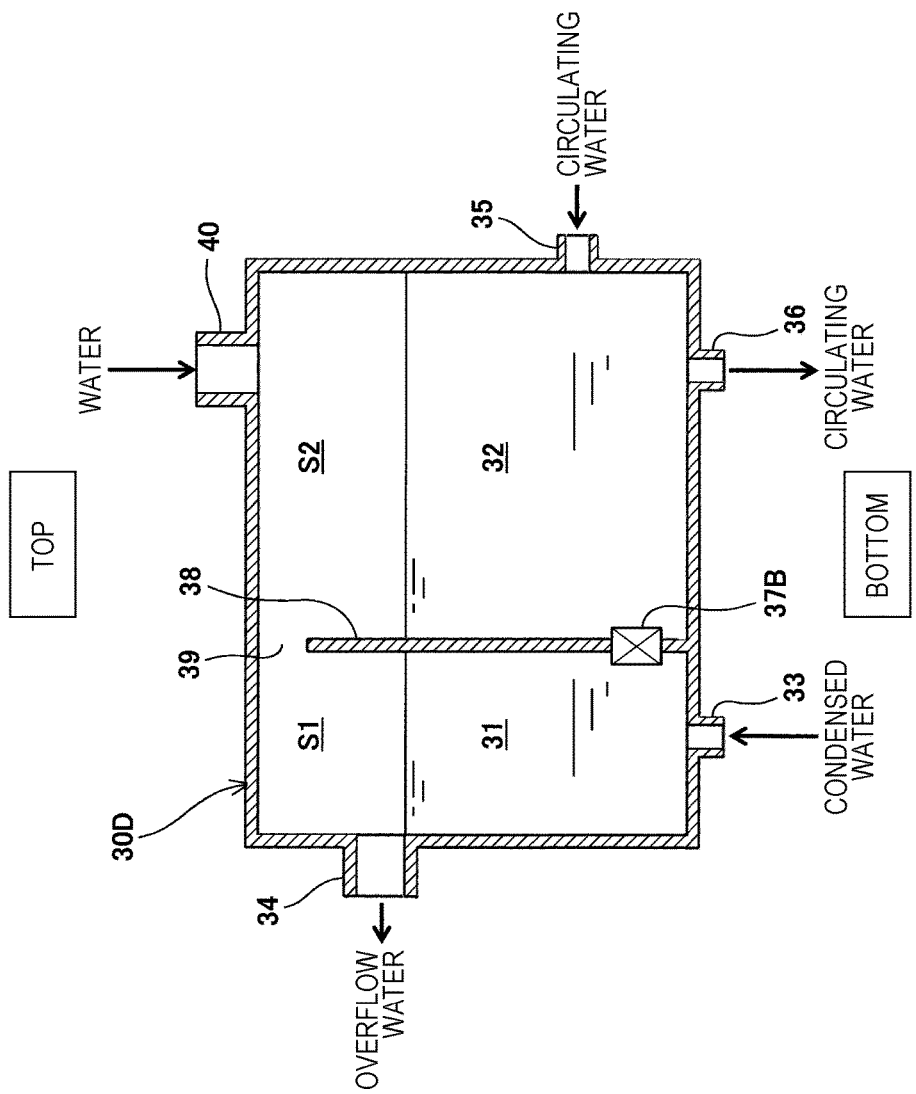
FIG. 6 illustrates an example of the reservoir tank of the hydrogen generator of a fourth example of the first embodiment.

FIG. 6 illustrates an example of the reservoir tank of the hydrogen generator of a fourth example of the first embodiment.

The hydrogen generator 100 of the fourth example has the following structure: in the hydrogen generator 100 according to any one of the first to fifth aspects or any one of the first and second examples of the first embodiment, a reservoir tank 30D has the partition 38 that serves to divide the inside of the reservoir tank 30D into the first reservoir 31 and the second reservoir 32, the first communicator 37 has a check valve 37B provided to the partition 38, and the check valve 37B blocks the flow of water from the second reservoir 32 to the first reservoir 31. The check valve 37B may have any of known structures, and the description thereof is therefore omitted. FIG. 6 illustrates an example in which the check valve 37B is provided to the partition 38 of the reservoir tank 30A of the first example; however, such a check valve may be provided to the partition 38 of the reservoir tank 30B of the second example.

In this structure, only when the water in the second reservoir 32 runs short, the condensed water in the first reservoir 31 flows into the second reservoir 32 through the check valve 37B in an amount equivalent to the amount of the water running short. In other words, only when the water level in the second reservoir 32 is lower than the water level in the first reservoir 31, the condensed water in the first reservoir 31 can be allowed to flow into the second reservoir 32 through the check valve 37B. Moreover, since the check valve 37B blocks the flow of water from the second reservoir 32 to the first reservoir 31, the diffusion of the circulating water (purified water) in the second reservoir 32 to the condensed water in the first reservoir 31 is properly reduced or prevented as compared with the case where such a check valve 37B is not provided.

Except for this change, the hydrogen generator 100 of the fourth example may have the same structure as the hydrogen generator 100 according to any one of the first to fifth aspects or any one of the first and second examples of the first embodiment.

Second Embodiment

Figure 7:
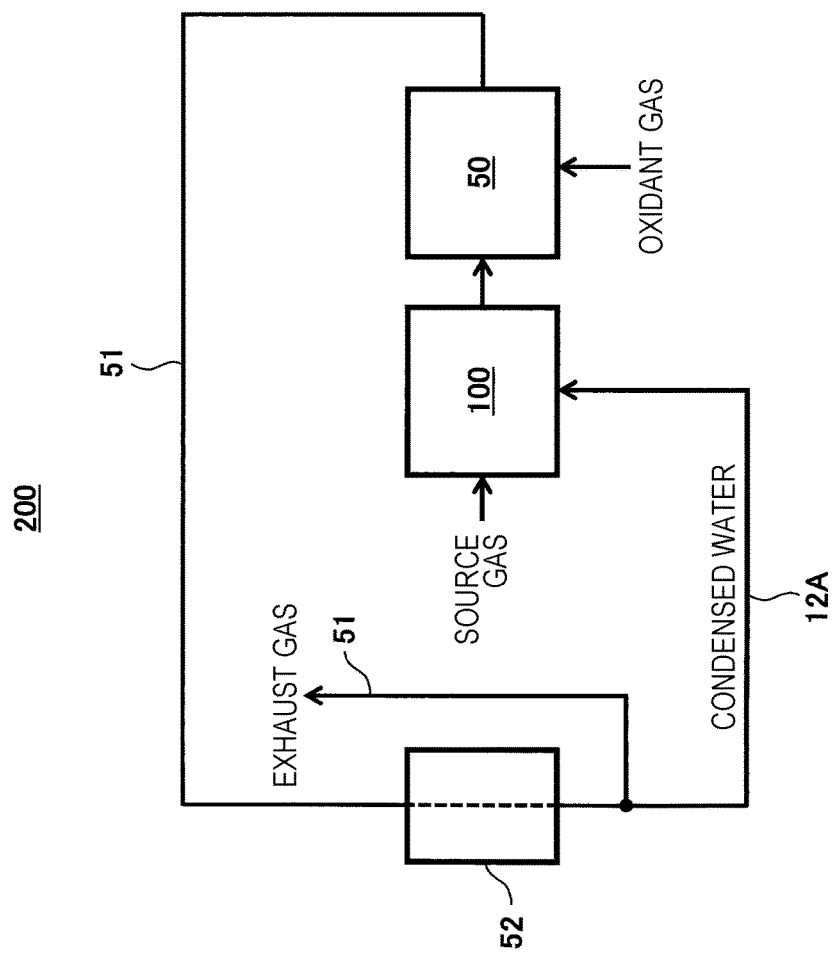
FIG. 7 illustrates an example of a fuel cell system according to a second embodiment.

FIG. 7 illustrates an example of a fuel cell system according to a second embodiment.

In the example illustrated in FIG. 7, a fuel cell system 200 of the second embodiment includes the hydrogen generator 100 according to any one of the first to fifth aspects or any one of the first to fourth examples of the first embodiment, a fuel cell 50, and an exhaust gas channel 51.

The fuel cell 50 generates power using an oxidant gas and a hydrogen-containing gas supplied from the hydrogen generator 100. An example of the oxidant gas is air. The fuel cell 50 may be any type of fuel cell. Examples of the fuel cell 50 include a polymer electrolyte fuel cell, a solid oxide fuel cell, and a phosphoric acid fuel cell.

The exhaust gas channel 51 is a channel through which the exhaust gas emitted from the fuel cell 50 flows. The condensed water channel 12A is a channel through which condensed water generated by cooling of the exhaust gas flows. The exhaust gas contains steam, and examples of the exhaust gas include an anode offgas and cathode offgas emitted from the fuel cell 50. In the case where the anode offgas and cathode offgas are combusted by a combustor (not illustrated), the combustion exhaust gas emitted from the combustor can be an example of the exhaust gas.

The exhaust gas channel 51 properly has a condenser 52. In the condenser 52, the exhaust gas is cooled, and then steam in the exhaust gas is condensed. The condensed water is separated from the exhaust gas channel 51 through which the exhaust gas flows and then flows to the hydrogen generator 100 through the condensed water channel 12A. The condensed water is held in the first reservoir 31 of the reservoir tank 30 of the hydrogen generator 100 as illustrated in FIG. 1.

The condenser 52 may have any structure provided that it can condense the steam contained in the exhaust gas. An example of the condenser 52 is a heat exchanger in which the exhaust gas is used as a heating fluid. Specific examples of the heat exchanger will be described later in first and second examples. In the first example, a heat exchanger in a polymer electrolyte fuel cell system is described; in the second example, a heat exchanger in a solid oxide fuel cell system is described.

As the fuel cell 50 can be regarded as a hydrogen-utilizing apparatus using a hydrogen-containing gas generated by the hydrogen generator 100 of the first embodiment or any of the first to fourth examples of the first embodiment, the structure and operation of the hydrogen generator 100 of the second embodiment can be the same as those in the first embodiment or any of the first to fourth examples of the first embodiment. Accordingly, detailed description thereof is omitted.

The fuel cell system 200 of the second embodiment enables the water treatment system to have a smaller size and simplified structure as compared with known techniques. The fuel cell system 200 of the second embodiment enables the necessary cost of the water treatment system to be reduced as compared with known techniques.

Specifically, the inside of the single reservoir tank 30 is divided into the first reservoir 31 and the second reservoir 32 as illustrated in FIG. 1. The condensed water and the circulating water flow into the first reservoir 31 and the second reservoir 32, respectively. The first reservoir 31 is open to atmospheric air through the first outlet 34 from which the condensed water overflows to the outside, and the condensed water held in the first reservoir 31 can be therefore degassed without the degassing mechanism described in Japanese Unexamined Patent Application Publication No. 2012-199019.

With reference to FIG. 1, the pressure in the internal space S1 of the first reservoir 31 is maintained to be the same as the pressure in the internal space S2 of the second reservoir 32, and the water levels in the first reservoir 31 and second reservoir 32 are therefore free from the pressure difference generated between the condensed water channel 12A and the circulating water channel 13. That is, in the hydrogen generator 100 used in the fuel cell system 200 of the second embodiment, only when the water in the second reservoir 32 runs short, the condensed water in the first reservoir 31 flows into the second reservoir 32 through the first communicator 37 in an amount equivalent to the amount of the water running short.

The condensed water generated by cooling of the exhaust gas may contain a component that contaminates the reforming catalyst and the catalyst used in the fuel cell system 50; on the other hand, the circulating water that flows through the circulating water channel 13 is less likely to contain such a catalyst-contaminating component because it is free from a chemical reaction.

As a result, a flow of the condensed water containing a component that contaminates the reforming catalyst and the catalyst used in the fuel cell system 50, such as chlorine, calcium, sulfuric acid, or ammonium, into the purified circulating water more than necessary are reduced or prevented.

This mechanism enables the amount of the ion exchange resin 14A provided to the circulating water channel 13 to be reduced in the fuel cell system 200 of the second embodiment as compared with known techniques.

In the fuel cell system 200 of the second embodiment, the circulating water in the second reservoir 32 flows through the circulating water channel 13 without overflowing to the outside. Hence, in the case where the amount of the water in the reservoir tank 30 is in excess, only the condensed water is discharged. In other words, the circulating water to be purified by the ion exchange resin filter 14 is not discharged in vain. Thus, the amount of the ion exchange resin 14A can be reduced as compared with the case in which the circulating water is allowed to overflow to the outside to be discharged.

In the fuel cell system 200 of the second embodiment, each of the second inlet 35 and the second outlet 36 of the second reservoir 32 is connected not to the condensed water channel 12A but to the circulating water channel 13. The condensed water channel 12A through which the condensed water containing a component that contaminates the reforming catalyst, such as chlorine, calcium, sulfuric acid, or ammonium, flows can be appropriately separated from the second reservoir 32 that holds the circulating water (purified water) in the single reservoir tank 30.

First Example

Figure 8:
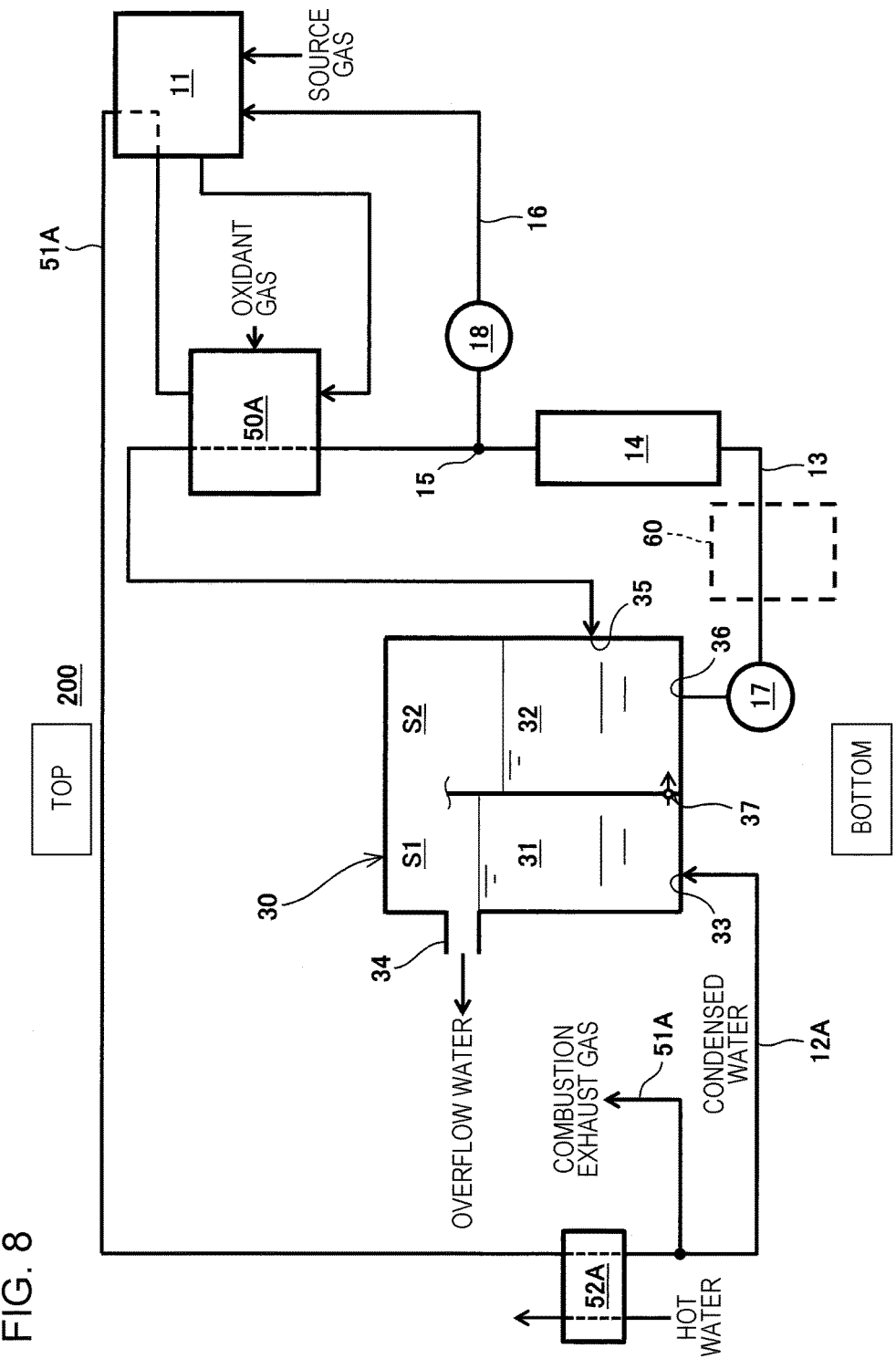
FIG. 8 illustrates an example of the fuel cell system of a first example of the second embodiment.

FIG. 8 illustrates an example of the fuel cell system of a first example of the second embodiment.

In the example illustrated in FIG. 8, the fuel cell system 200 of the first example includes the reformer 11, the condensed water channel 12A, the circulating water channel 13, the ion exchange resin filter 14, the junction 15, the reforming water channel 16, the first pump 17, the second pump 18, the reservoir tank 30, a heater (cell stack 50A), an exhaust gas channel 51A, a heat exchanger 52A, and a cooler 60.

Since the reformer 11, the condensed water channel 12A, the circulating water channel 13, the ion exchange resin filter 14, the junction 15, the reforming water channel 16, the first pump 17, the second pump 18, and the reservoir tank 30 are the same as those in the hydrogen generator 100 of the first embodiment or the fuel cell system 200 of the second embodiment, the detailed description thereof is omitted.

The heater is provided to the circulating water channel 13 and heats the circulating water. The heater may have any structure provided that it can heat the circulating water that flows through the circulating water channel 13; in the fuel cell system 200 of the first example, the heater is the cell stack 50A of a polymer electrolyte fuel cell.

Specifically, in the case where the fuel cell system 200 is a polymer electrolyte fuel cell system, the reaction in the cell stack 50A of the polymer electrolyte fuel cell system is an exothermic reaction. The temperature of the cell stack 50A is therefore increased by the heat emitted in power generation; however, the temperature thereof needs to be maintained to be at the intended operation temperature (for example, approximately from 60 to 80° C.). Hence, the circulating water channel 13 passes through the inside of the cell stack 50A, so that the temperature of the cell stack 50A is controlled so as not to exceed the operation temperature. The cell stack 50A transfers heat to the circulating water that is at low temperature and thus serves as the heater for heating the circulating water. This mechanism enables the heat generated by the cell stack 50A to increase the temperature of the circulating water, which reduces or prevents reproduction of bacteria without use of an additional chemical treatment.

The cooler 60 is provided to the circulating water channel 13 and cools the circulating water. The cooler 60 may have any structure provided that it can cool the circulating water that flows through the circulating water channel 13. An example of the cooler 60 is an air-cooled radiator. Cooling the circulating water, which flows through the circulating water channel 13, in this manner enables the temperature of the cell stack 50A to be kept at the intended operation temperature. In other words, the cooler 60 can appropriately reduce or prevent an excessive increase in the temperature of the circulating water that has passed through the cell stack 50A.

In order to adjust the temperature of the cell stack 50A to be at the intended operation temperature, a controller (not illustrated) may be provided to perform a feedback control of the flow rate of the circulating water on the basis of temperature detected by a temperature detector (not illustrated).

In the fuel cell system 200 of the first example, the circulating water in the circulating water channel 13 flows through the second reservoir 32 of the reservoir tank 30, the cooler 60, the ion exchange resin filter 14, the junction 15, and the heater (cell stack 50A) in this sequence. The circulating water therefore passes through the cooler 60 to be cooled before it flows into the ion exchange resin filter 14. This enables the working temperature of the material of the ion exchange resin 14A to be maintained at a low level and therefore leads to an increase in the durability of the ion exchange resin filter 14. The junction 15 disposed downstream of the ion exchange resin filter 14 serves to reduce or prevent the intrusion of air bubbles into the reforming water flowing through the reforming water channel 16 as described above. Thus, shortage of water in the reformer 11 and the occurrence of breakdown of the reformer 11 due to the air bubbles are reduced or prevented, which leads to an increase in the durability of the reformer 11. Furthermore, the flow of the circulating water through the heater (cell stack 50A) enables reproduction of bacteria to be reduced or prevented as described above.

In the fuel cell system 200 of the first example, the heat exchanger 52A through which the exhaust gas channel 51A passes is provided as a condenser. With reference to FIG. 8, the heat exchanger 52A may be a counterflow heat exchanger in which the fluids to be subjected to heat exchange flow in opposite directions and of which the heat exchange is more efficient than a parallel flow heat exchanger. In the exhaust gas channel 51A, for example, a combustion exhaust gas emitted from a combustor (not illustrated) disposed adjacent to the reformer 11 flows and is used as a heating fluid in the heat exchanger 52A. The combustion exhaust gas can be generated, for example, through combusting the anode offgas or cathode offgas emitted from the cell stack 50A by the combustor. In this case, for instance, stored water that is to be supplied can be used as the heat-receiving fluid in the heat exchanger 52A. The heat exchange by the heat exchanger 52A therefore enables a decrease in the temperature of the combustion exhaust gas, so that the steam contained in the combustion exhaust gas can be properly collected as the condensed water. In addition, the heat of the combustion exhaust gas can be properly collected by stored water that is to be supplied.

The fuel cell system 200 of the first example may have, in place of or in addition to the cell stack 50A of the polymer electrolyte fuel cell, a heat exchanger (not illustrated) as the heater in which the combustion exhaust gas flowing through the exhaust gas channel 51A and the circulating water exchange heat. In this case, the fuel cell system 200 of the first example may have, in place of or in addition to the air-cooled radiator, a heat exchanger (not illustrated) as the cooler 60 in which stored water and the circulating water exchange heat. In this structure, the temperature of the combustion exhaust gas can be decreased, and the heat of the combustion exhaust gas can be properly collected by the stored water. Moreover, the steam contained in the combustion exhaust gas can be condensed in order to collect condensed water, and the temperature of the combustion exhaust gas to be emitted to the outside of the fuel cell system 200 can be decreased.

Except for these points, the fuel cell system 200 of the first example may have the same structure as the fuel cell system 200 of the second embodiment.

Second Example

Figure 9:
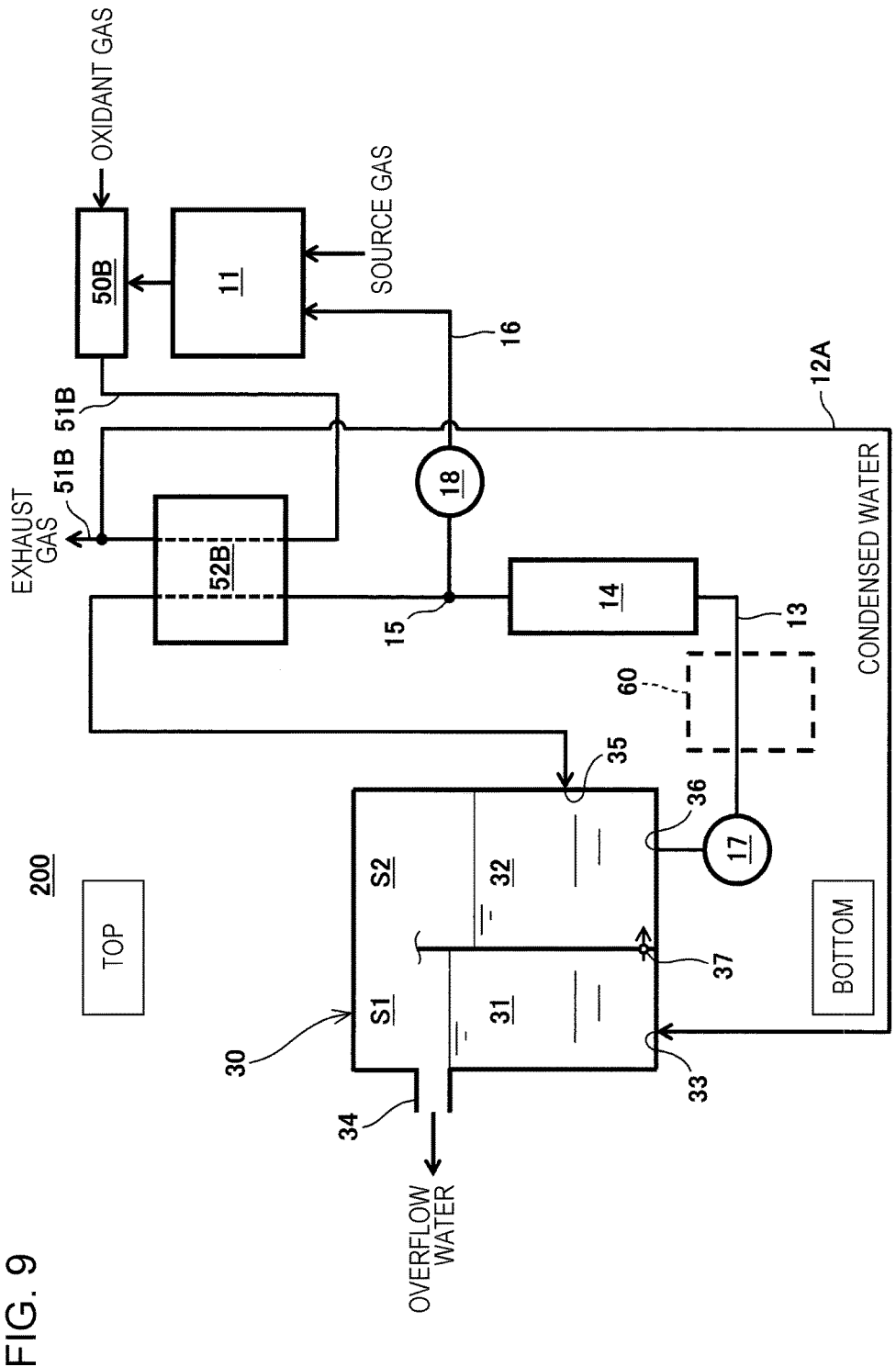
FIG. 9 illustrates an example of the fuel cell system of a second example of the second embodiment.
Figure 10:
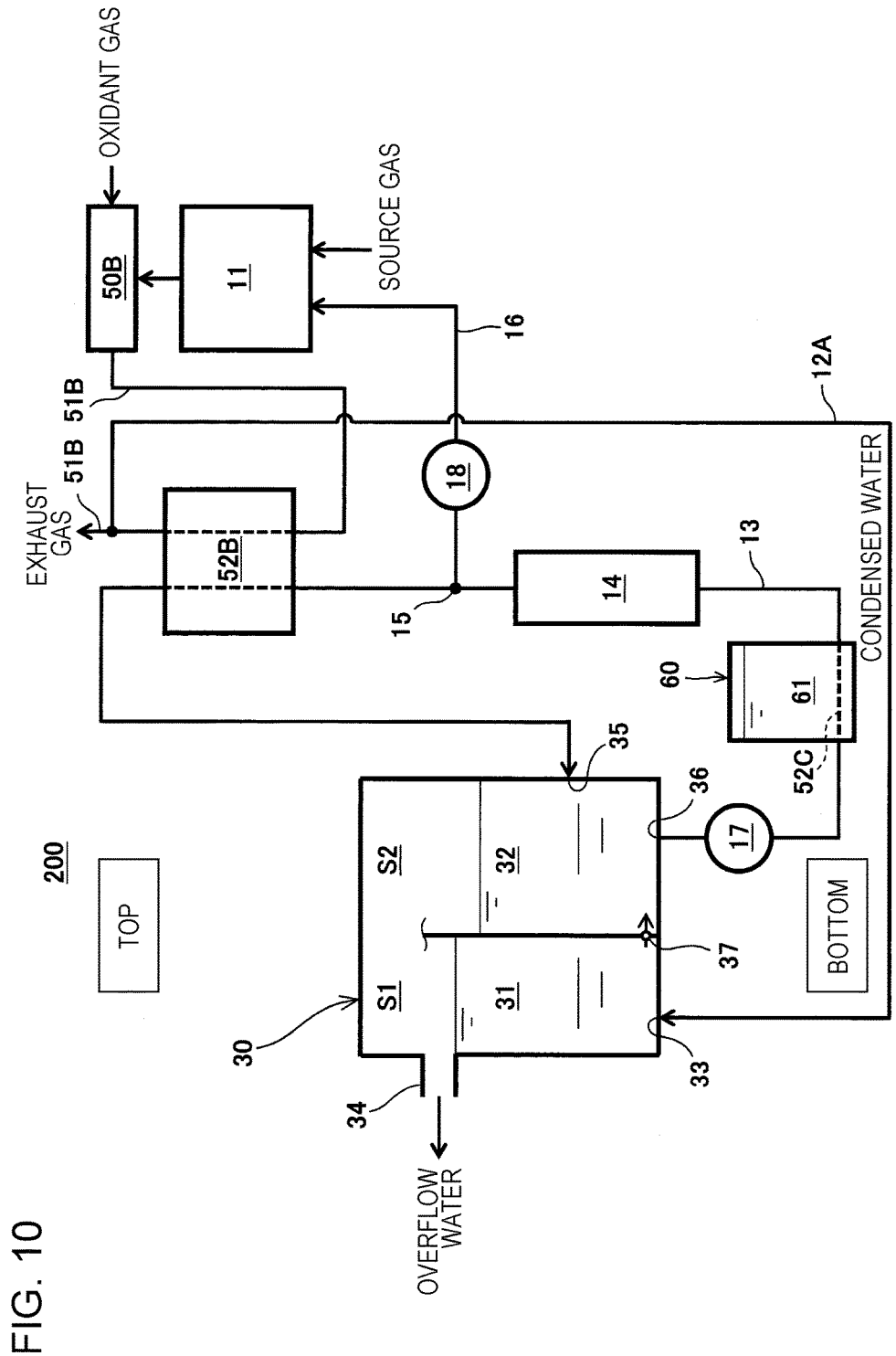
FIG. 10 illustrates another example of the fuel cell system in a second example of the second embodiment.

FIGS. 9 and 10 each illustrate an example of the fuel cell system of a second example of the second embodiment.

In the example illustrated in FIG. 9, the fuel cell system 200 of the second example includes the reformer 11, the condensed water channel 12A, the circulating water channel 13, the ion exchange resin filter 14, the junction 15, the reforming water channel 16, the first pump 17, the second pump 18, the reservoir tank 30, an exhaust gas channel 51B, a solid oxide fuel cell 50B, a heater (first heat exchanger 52B), and the cooler 60.

Since the reformer 11, the condensed water channel 12A, the circulating water channel 13, the ion exchange resin filter 14, the junction 15, the reforming water channel 16, the first pump 17, the second pump 18, and the reservoir tank 30 are the same as those in the hydrogen generator 100 of the first embodiment or the fuel cell system 200 of the second embodiment, the detailed description thereof is omitted.

The heater is provided to the circulating water channel 13 and heats the circulating water. The heater may have any structure provided that it can heat the circulating water that flows through the circulating water channel 13; in the fuel cell system 200 of the second example, the heater is the first heat exchanger 52B in which the circulating water and the exhaust gas exchange heat. In other words, the first heat exchanger 52B is provided to the exhaust gas channel 51B and the circulating water channel 13.

Specifically, in the case where the fuel cell system 200 is a solid oxide fuel cell system, high-temperature exhaust gas (for example from 600 to 800° C.) is emitted from the solid oxide fuel cell 50B. The exhaust gas channel 51B and circulating water channel 13 pass through the first heat exchanger 52B, so that the exhaust gas that serves as a heating fluid and the circulating water that serves as the heat-receiving fluid exchange heat.

The first heat exchanger 52B transfers heat to the circulating water that is at low temperature and thus serves as the heater for heating the circulating water. This mechanism enables the heat exchange by first heat exchanger 52B to increase the temperature of the circulating water, which reduces or prevents reproduction of bacteria without use of an additional chemical treatment.

The first heat exchanger 52B draws heat from the exhaust gas that is in a high-temperature state and therefore also serves as a condenser for cooling the exhaust gas flowing through the exhaust gas channel 51B. This mechanism enables the heat exchange by first heat exchanger 52B to decrease the temperature of the exhaust gas; hence, the steam contained in the exhaust gas can be properly collected as condensed water. In addition, the heat of the exhaust gas can be properly collected by the circulating water.

The cooler 60 is provided to the circulating water channel 13 and cools the circulating water. The cooler 60 may have any structure provided that it can cool the circulating water that flows through the circulating water channel 13. In the fuel cell system 200 of the second example, as illustrated in FIG. 10, the cooler 60 may include a hot water storage tank 61 and a second heat exchanger 52C in which the stored water held in the hot water storage tank 61 and the circulating water exchange heat. The second heat exchanger 52C is provided to the circulating water channel 13. In other words, part of the circulating water channel 13 that passes through the inside of the hot water storage tank 61 serves as the second heat exchanger 52C.

Cooling the circulating water that flows through the circulating water channel 13 in this manner enables the temperature of the circulating water to be maintained at a proper level that is necessary for condensing the steam contained in the exhaust gas in the first heat exchanger 52B. That is, the cooler 60 can reduce or prevent an excessive increase in the temperature of the circulating water that has passed through the first heat exchanger 52B. In addition, the heat of the circulating water can be properly collected by the stored water that is to be supplied.

In order to adjust the temperature of the circulating water to be at a predetermined appropriate temperature, a controller (not illustrated) may be provided to perform a feedback control of the flow rate of the circulating water on the basis of temperature detected by a temperature detector (not illustrated).

In the fuel cell system 200 of the second example, the circulating water in the circulating water channel 13 flows through the second reservoir 32 of the reservoir tank 30, the cooler 60, the ion exchange resin filter 14, the junction 15, and the heater (first heat exchanger 52B) in this sequence. The circulating water therefore passes through the cooler 60 to be cooled before it flows into the ion exchange resin filter 14. This enables the working temperature of the material of the ion exchange resin 14A to be maintained at a low level and therefore leads to an increase in the durability of the ion exchange resin filter 14. The junction 15 disposed downstream of the ion exchange resin filter 14 serves to reduce or prevent the intrusion of air bubbles into the reforming water flowing through the reforming water channel 16 as described above. Thus, shortage of water in the reformer 11 and the occurrence of breakdown of the reformer 11 due to the air bubbles are reduced or prevented, which leads to an increase in the durability of the reformer 11. Furthermore, the flow of the circulating water through the heater (first heat exchanger 52B) enables reproduction of bacteria to be reduced or prevented as described above.

FIG. 10 illustrates an example in which the cooler 60 of the solid oxide fuel cell system illustrated in FIG. 9 has the hot water storage tank 61 and the second heat exchanger 52C, but the structure is not limited thereto. The cooler 60 in the polymer electrolyte fuel cell system illustrated in FIG. 8, for instance, may have the hot water storage tank 61 and the second heat exchanger 52C.

All of the above-mentioned embodiments and examples may be combined with each other provided that the combined embodiments and examples do not contradict with each other. From the foregoing description, modifications and other embodiments of the present disclosure are obvious to persons skilled in the art. The foregoing description should be therefore interpreted only as an example and is provided for the purpose of teaching the best mode for carrying out the present disclosure to persons skilled in the art. The structural and/or functional details may be substantially altered without departing from the spirit of the present disclosure.

An aspect of the present disclosure can be utilized as a hydrogen generator and fuel cell system that enables the water system to have a reduced size and a simplified structure as compared with known techniques. Another aspect of the present disclosure can be utilized as a hydrogen generator and fuel cell system that enables a reduction in the necessary cost of the water system as compared with known techniques.

What is claimed is:

1. A hydrogen generator comprising:
   a reformer which generates a hydrogen-containing gas from a source gas and reforming water;
   a condensed water channel through which condensed water flows;
   a circulating water channel through which circulating water flows;
   an ion exchange resin filter which is provided to the circulating water channel and deionizes the circulating water;
   a reservoir tank which includes a first reservoir provided to the condensed water channel and a second reservoir provided to the circulating water channel;
   a first communicator through which the first and second reservoirs are in communication with each other; and
   a reforming water channel which extends from a junction of the circulating water channel and supplies the circulating water as reforming water to the reformer, wherein
   the first reservoir has a first inlet from which the condensed water flows into the first reservoir and a first outlet from which the condensed water overflows to the outside of the reservoir tank,
   the second reservoir has a second inlet from which the circulating water flows into the second reservoir and a second outlet of which the circulating water flows out of the second reservoir,
   the condensed water channel is connected only to the first reservoir out of the first and second reservoirs,
   the first communicator is provided below the first outlet, and
   the reservoir tank is configured such that the pressure in the inner space of the first reservoir is maintained to be the same as the pressure in the inner space of the second reservoir.

2. The hydrogen generator according to claim 1, wherein the reservoir tank is configured such that the circulating water in the second reservoir flows through the circulating water channel without overflowing to the outside of the reservoir tank.

3. The hydrogen generator according to claim 1, wherein each of the second inlet and the second outlet is connected to the circulating water channel without being connected to the condensed water channel.

4. The hydrogen generator according to claim 1, further comprising:
   a first pump provided to the circulating water channel; and
   a second pump provided to the reforming water channel.

5. The hydrogen generator according to claim 1, wherein the junction is disposed at part of the circulating water channel which is downstream of the ion exchange resin filter and upstream of the second reservoir in the flow direction of the circulating water.

6. The hydrogen generator according to claim 1, wherein the reservoir tank further includes a second communicator, provided above the first outlet, through which the first reservoir and the second reservoir are in communication with each other.

7. The hydrogen generator according to claim 1, wherein the reservoir tank is configured such that the inner space of each of the first reservoir and the second reservoir is open to atmospheric air.

8. The hydrogen generator according to claim 1, wherein
the reservoir tank has a partition which divides the inside of the reservoir tank into the first reservoir and the second reservoir, and
the first communicator is a hole formed in the partition.

9. The hydrogen generator according to claim 1, wherein
the reservoir tank has a partition that divides the inside of the reservoir tank into the first reservoir and the second reservoir,
the first communicator includes a check valve provided to the partition, and
the check valve blocks the flow of water from the second reservoir to the first reservoir.

10. A fuel cell system comprising:
a reformer which generates a hydrogen-containing gas from a source gas and reforming water;
a fuel cell which generates power from the hydrogen-containing gas and an oxidant gas;
an exhaust gas channel through which an exhaust gas emitted from the fuel cell flows;
a condensed water channel through which condensed water generated by cooling of the exhaust gas flows;
a circulating water channel through which circulating water flows;
an ion exchange resin filter which is provided to the circulating water channel and deionizes the circulating water;
a reservoir tank which includes a first reservoir provided to the condensed water channel and a second reservoir provided to the circulating water channel;
a first communicator through which the first and second reservoirs are in communication with each other; and
a reforming water channel which extends from a junction of the circulating water channel and supplies the circulating water as reforming water to the reformer, wherein
the first reservoir has a first inlet from which the condensed water flows into the first reservoir and a first outlet from which the condensed water overflows to the outside of the reservoir tank,
the second reservoir has a second inlet from which the circulating water flows into the second reservoir and a second outlet of which the circulating water flows out of the second reservoir,
the condensed water channel is connected only to the first reservoir out of the first and second reservoirs,
the first communicator is provided below the first outlet, and
the reservoir tank is configured such that the pressure in the inner space of the first reservoir is maintained to be the same as the pressure in the inner space of the second reservoir.

11. The fuel cell system according to claim 10, further comprising:
a heater provided to the circulating water channel and heating the circulating water; and
a cooler provided to the circulating water channel and cooling the circulating water.

12. The fuel cell system according to claim 11, wherein
the heater is a cell stack of the fuel cell.

13. The fuel cell system according to claim 11, wherein
the heater is a first heat exchanger in which the circulating water and the exhaust gas exchange heat.

14. The fuel cell system according to claim 13, wherein
the cooler includes a second heat exchanger in which the circulating water and stored water held in a hot water storage tank exchange heat.

15. The fuel cell system according to claim 10, wherein
the circulating water in the circulating water channel flows through the second reservoir, a cooler, the ion exchange resin filter, the junction, and a heater in this sequence.

16. A fuel cell system comprising:
a reformer which generates a hydrogen-containing gas from a source gas and reforming water;
a solid oxide fuel cell which generates power from the hydrogen-containing gas and an oxidant gas;
an exhaust gas channel through which an exhaust gas emitted from the solid oxide fuel cell flows;
a condensed water channel through which condensed water generated by cooling of the exhaust gas flows;
a circulating water channel through which circulating water flows;
a first heat exchanger which is provided to the exhaust gas channel and the circulating water channel and in which the exhaust gas and the circulating water exchange heat;
an ion exchange resin filter which is provided to the circulating water channel and deionizes the circulating water;
a second heat exchanger which is provided to the circulating water channel and in which the circulating water and stored water exchange heat;
a reservoir tank which includes a first reservoir provided to the condensed water channel and a second reservoir provided to the circulating water channel;
a first communicator through which the first and second reservoirs are in communication with each other; and
a reforming water channel which extends from a junction of the circulating water channel and supplies the circulating water as reforming water to the reformer, wherein
the first reservoir has a first inlet from which the condensed water flows into the first reservoir and a first outlet from which the condensed water overflows to the outside of the reservoir tank,
the second reservoir has a second inlet from which the circulating water flows into the second reservoir and a second outlet of which the circulating water flows out of the second reservoir,
the first communicator is provided below the first outlet, and
the reservoir tank is configured such that the pressure in the inner space of the first reservoir is maintained to be the same as the pressure in the inner space of the second reservoir.

* * * * *